(12) United States Patent
Vahidsafa et al.

(10) Patent No.: US 9,052,911 B2
(45) Date of Patent: Jun. 9, 2015

(54) MECHANISM FOR CONSISTENT CORE HANG DETECTION IN A A PROCESSOR CORE

(75) Inventors: Ali Vahidsafa, Palo Alto, CA (US); Chih Heng Liu, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 333 days.

(21) Appl. No.: 13/585,348

(22) Filed: Aug. 14, 2012

(65) Prior Publication Data

US 2014/0052966 A1 Feb. 20, 2014

(51) Int. Cl.
*G06F 11/07* (2006.01)
*G06F 9/38* (2006.01)
*G06F 9/30* (2006.01)

(52) U.S. Cl.
CPC ............ *G06F 9/3861* (2013.01); *G06F 9/3869* (2013.01); *G06F 11/0721* (2013.01); *G06F 11/076* (2013.01); *G06F 9/30101* (2013.01)

(58) Field of Classification Search
CPC .......................... G06F 11/0757; G06F 11/3055
USPC ...................................................... 714/51, 55
See application file for complete search history.

(56) References Cited

U.S. PATENT DOCUMENTS

| | | | | |
|---|---|---|---|---|
| 6,543,003 | B1 * | 4/2003 | Floyd et al. | 714/10 |
| 7,725,685 | B2 | 5/2010 | Floyd et al. | |
| 8,296,632 | B1 * | 10/2012 | Shokrollahi | 714/781 |
| 2006/0179289 | A1 * | 8/2006 | Floyd et al. | 712/227 |
| 2007/0061630 | A1 * | 3/2007 | Fields et al. | 714/43 |
| 2007/0162529 | A1 * | 7/2007 | Sato et al. | 708/3 |
| 2008/0141000 | A1 * | 6/2008 | Floyd et al. | 712/216 |
| 2009/0132791 | A1 * | 5/2009 | Fields et al. | 712/219 |
| 2010/0036984 | A1 * | 2/2010 | Goodman et al. | 710/112 |
| 2010/0079182 | A1 * | 4/2010 | Lien et al. | 327/175 |
| 2011/0208997 | A1 * | 8/2011 | Czajkowski | 714/10 |
| 2011/0307233 | A1 * | 12/2011 | Tseng et al. | 703/14 |
| 2012/0089984 | A1 * | 4/2012 | Adar et al. | 718/103 |
| 2012/0304184 | A1 * | 11/2012 | Yamashita et al. | 718/102 |

* cited by examiner

*Primary Examiner* — Chae Ko
(74) *Attorney, Agent, or Firm* — Meyertons Hood Kivlin Kowert & Goetzel; Erik A. Heter

(57) ABSTRACT

Mechanism for consistent core hang detection on a processor with multiple processor cores, each having one or more instruction execution pipelines. Each core may also include a hang detection unit with a counter unit that may generate a count value based on a clock source having a frequency that is independent of a frequency of a processor core clock. The hang detection unit may also include a detector logic unit that may determine whether a given instruction execution pipeline has ceased processing a given instruction based upon a state of the processor core and whether or not the given instruction has completed execution prior to the count value exceeding a predetermined value.

20 Claims, 3 Drawing Sheets

MECHANISM FOR CONSISTENT CORE HANG DETECTION IN A A PROCESSOR CORE

BACKGROUND

1. Technical Field

This disclosure relates to processor operation, and more particularly to mechanisms for detecting core hang.

2. Description of the Related Art

Today's modern processors still occasionally suffer misprocessing errors that cause the processor to stop executing instructions, which is referred to as hanging. To avoid complete crashes in the event of a hang, many conventional processors employ some type of hang detection mechanism. Some conventional hang detection mechanisms use a timer that is sourced from a core clock. If the processor does not execute any instruction at the end of some number of timer pulses, the detection logic flags a hang condition. However, due to the complexity of many processors, there may be situations that legitimately take longer than some predefined number of timer pulses, and which may not be accounted for in these conventional detection mechanisms. More particularly, chip multiprocessors are one example in which a conventional hang detection mechanism may not consistently detect a hang condition, since each of the cores may operate at different and/or variable frequencies and voltages, for example.

SUMMARY OF THE EMBODIMENTS

Various embodiments of a mechanism for consistent core hang detection on a processor are disclosed. In one embodiment, a processor includes a number of processor cores, each having one or more instruction execution pipelines. Each core may also include a hang detection unit with a counter unit that may be configured to provide a count value based on a clock source such as a free-running clock, for example, having a frequency that is independent of a frequency of a processor core clock. The hang detection unit may also include a detector logic unit that may be configured to determine whether a given instruction execution pipeline has ceased processing a given instruction based upon a state of the processor core and whether or not the given instruction has completed execution prior to the count value exceeding a predetermined value.

In one specific implementation, the counter unit may include a counter having a plurality of bits. The counter may be configured to programmably select which bit of the counter corresponds to the count value.

In another specific implementation, the detector logic unit may be configured to determine that the given instruction execution pipeline has ceased processing the given instruction in response to the count value exceeding the predetermined value and in response to detecting that the given instruction has not completed execution. The detector logic unit may also be configured to disable detection of a hang condition in response to a determination that a strand is in a predefined state in which instruction execution is stopped such as for known non-error conditions, for example.

In yet another specific implementation, while determining whether or not the given instruction has completed execution prior to the count value exceeding a predetermined value, the detector logic unit may be configured to increase the predetermined value in response to a determination that the given instruction has an execution time that is longer than a predetermined execution time.

Figure 1:
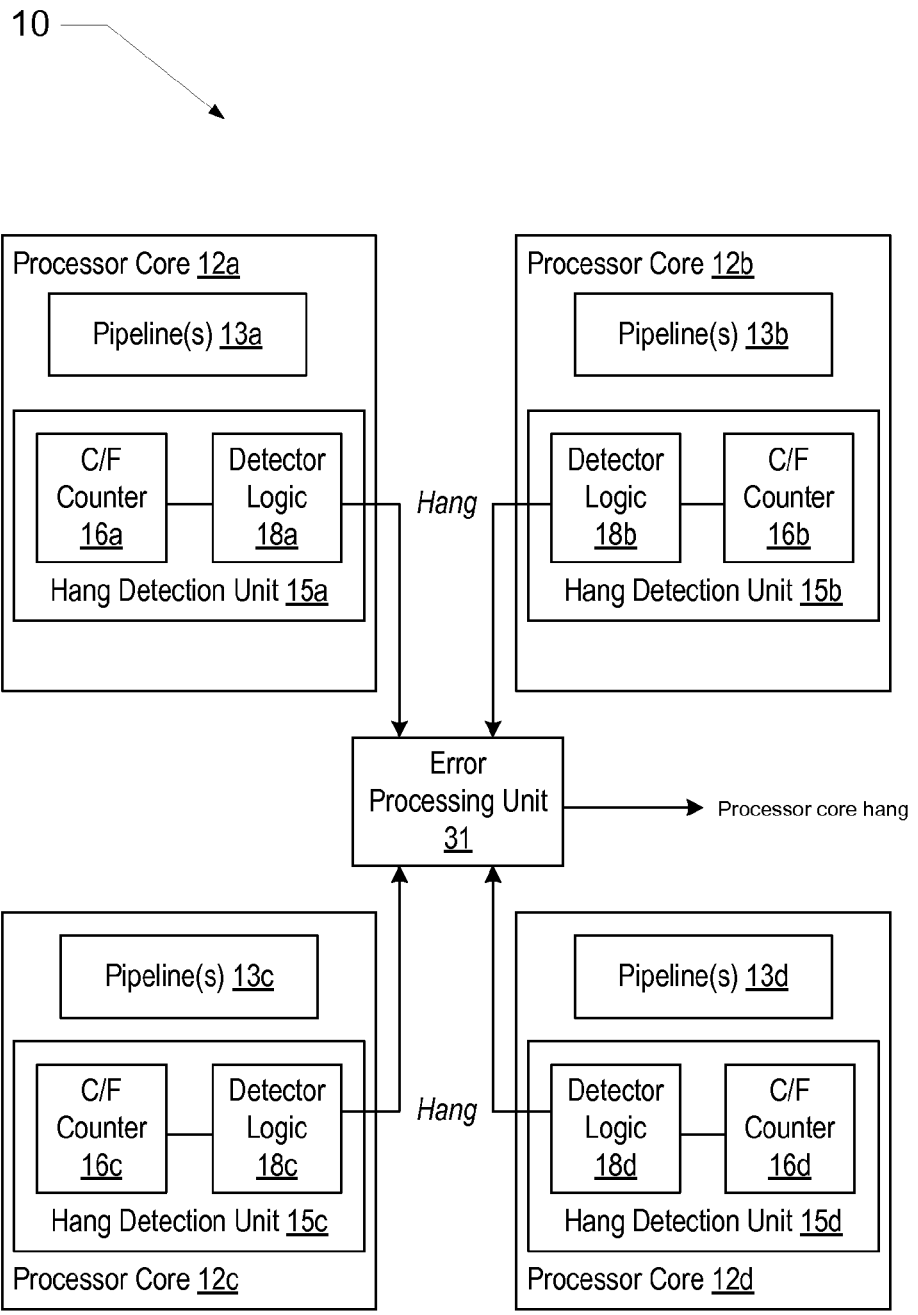
FIG. 1 is a block diagram of one embodiment of processor system including multiple processor cores.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a block diagram of one embodiment of processor system including multiple processor cores is shown. In the illustrated embodiment, the processor system 10 includes processor cores 12a through 12d. The processor system also includes an error processing unit 31 that is coupled to each of the processor cores 12a through 12d. It is noted that components having a reference designator with a number and a letter may be referred to by the number only where appropriate. For example, processor core 12 may be referred to when referring to any of the processor cores.

As shown, processor core 12a includes processor pipelines 13a, and a hang detection unit 15a, which includes a constant frequency (C/F) counter 16a and detector logic 18a. Similarly, each of the remaining processor cores 12 also includes respective pipelines 13, a respective constant frequency counter 16, and a respective detector logic 18.

As described in greater detail below, the hang detection unit 15 in each core 12 may be configured to detect when one or more of the pipelines 13 has ceased processing instructions (i.e., hung), and to responsively provide a hang detect signal to the error processing unit 31. More particularly, the hang detection unit 15 may be configured to determine whether a given instruction pipeline 13 has ceased processing a given instruction based upon, for example, a state of the processor core and whether or not the given instruction has completed execution prior to a count value of the constant frequency counter 16 has exceeded a predetermined value.

Figure 2:
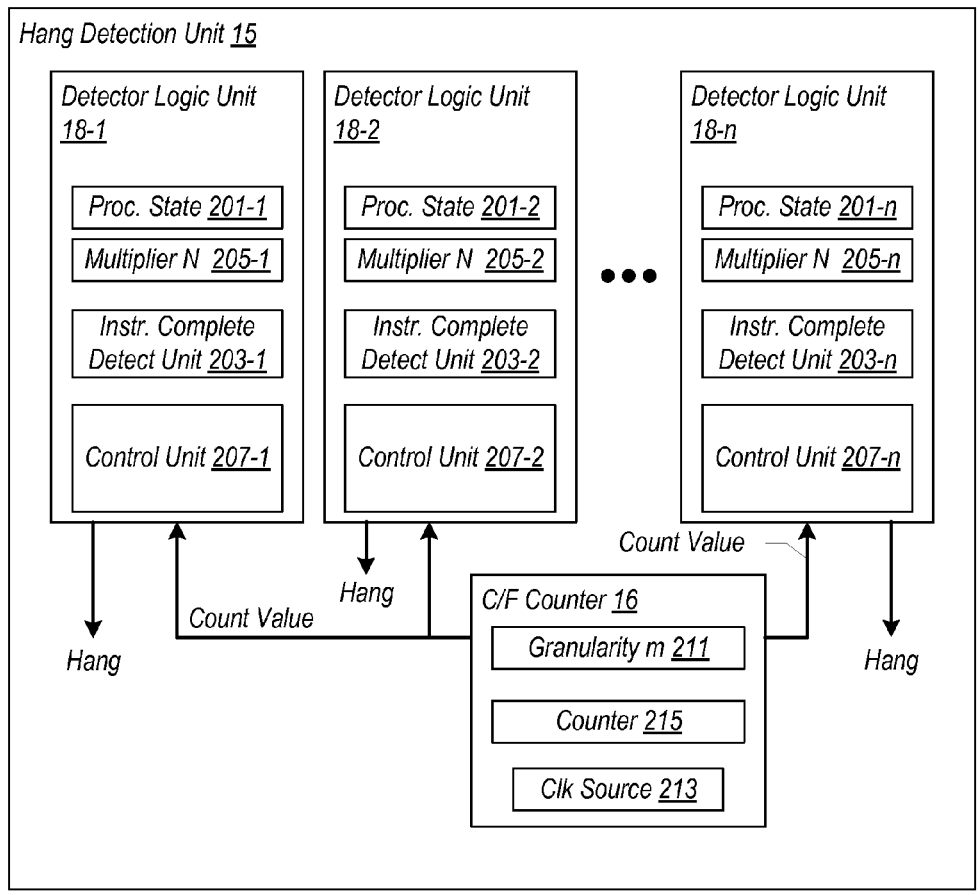
FIG. 2 is a block diagram depicting additional details of one embodiment of a hang detection unit.

Referring to FIG. 2, a block diagram depicting additional details of one embodiment of the hang detection unit of FIG. 1 is shown. Components that are similar to components shown in FIG. 1 are numbered identically for clarity and simplicity. The hang detection unit 15 of FIG. 2 includes a number of detector logic units, designated 18-1 through 18-$n$, where n may be any natural number other than zero. The hang detection unit 15 also includes a C/F counter 16 that is coupled to each of the detector logic units 18. In one embodiment, there may be one detector logic unit 18 for each execution thread or strand.

As shown, each of the detector logic units 18 includes a control unit 207, an instruction completion detection unit 203, a multiplier (N) register 205, and a processor state register 201. The C/F counter 16 includes a counter 215, a granularity (m) register 211, and a clock source 213.

In one embodiment, the clock source 213 may be a free-running clock that operates at 1.0 GHz and is independent of any clocks of the processor core. The counter 215 may be a counter/timer having some number of bits. More particularly, in one implementation, the counter/timer 215 may include nine bits having a resolution such that bit zero represents a 1 ns. Thus, the counter/timer 215 may increment once each nanosecond. The granularity (m) register 211 is a programmable register that may be configured to select which bit of the counter/timer 215 is provided as the count value. The granularity register 211 selects m, such that the representation is $2^m$ ns. Thus, if m were selected to be 0, then the count value would toggle every 1 ns. Similarly, if m were selected to be three, the count value would toggle every $2^3$=8 ns, and so on. It is noted that in other embodiments, the clock source 213 may operate at different frequencies, and the counter/timer 215 may have more or less bits and thus more or less granularity.

The multiplier register 205 is a programmable register that holds a count (N). The control unit 207 may be configured to count the number of times the count value increments and to compare that to the count (N) in the multiplier register 205 to determine if a predetermined count value has been exceeded. More particularly, the multiplier register 205 selects the timeout value such that N*$2^m$=timeout in ns. By using different values of m and n, an exact timeout value or a timeout range may be selected. For example, for an exact timeout value, m may be set to 0, and N may be set to a large number such as 1000 to obtain a timeout of 1000*$2^0$=1000 ns=1 ms. In an example timeout range, m may be programmed to 20, and N may be programmed to 2. Thus, the timeout range would be between 1×$2^{20}$=1.048 ms and 2×$2^{20}$=2.097 ms.

The instruction completion detection unit 203 may be configured to detect the completion of instructions executing in the strand. More particularly, monitor logic (not shown) within the instruction completion detection unit 203 may detect completion of any instruction in the strand and provide an instruction completion indication to the control unit 207.

In one embodiment, the processor state register 201 of each detector logic unit 18 may maintain processor state status bits which correspond to various predefined processor states. For example, in one embodiment, the predefined processor states that are tracked may include Halt, Park, and Pause. The Halt state refers the state in which software writes to a special (HALT) register to halt instruction execution for a particular strand. The execution may remain halted until software writes to the register again to unhalt the strand. The Park state refers to a state in which software suspends operation of a strand by writing to a Strand Running register. The Pause state refers to a state in which a strand is temporarily paused for some specified number of cycles. Software can write the number of cycles to a PAUSE register to pause instruction execution of a strand.

Accordingly, in one embodiment and as described further below in conjunction with the description of FIG. 3, the control unit 207 may be configured to determine whether or not there is a hang condition by monitoring the processor state, comparing the count value to N, and monitoring the instruction completion indication. The hang detection unit 15 may provide a hang indication to the error processing unit (e.g., error processing unit 31 of FIG. 1). In one embodiment, the hang detection indications may be provided in a wired-OR configuration such that if a hang condition is detected by any of the detector units 18-1 through 18-$n$, the hang detection unit 15 may provide the hang indication.

In addition, some instructions may be long latency instructions, or some instructions may cause longer than normal completion times. Accordingly, in one embodiment, the multiplier register 205 may be dynamically written during operation to extend the timeout for the strand. More particularly, in various embodiments these types of instructions may be flagged by the compiler, for example. Alternatively, opcodes of these types of instructions may be flagged, for example, during decode. Hardware in the instruction pipeline (e.g., pipeline 13), for example, may detect such a flag and cause the multiplier register 205 to be increased by a predetermined value dependent upon the flag. In other embodiments, software may detect these types of instructions and write a corresponding value to the multiplier register 205 to increase the timeout. It is noted that other mechanisms for detecting these types of instructions and increasing the value in the multiplier register 205 to increase the timeout are possible and contemplated. Once these instructions complete, and the count value being compared is reset, the multiplier register 205 may also be reset back to the previous or default value, as desired In FIG. 3, a flow diagram that describes operational aspects of the hang detection unit of FIG. 1 and FIG. 2 is shown. Referring collectively to FIG. 1 through FIG. 3, and beginning in block 301 of FIG. 3 the C/F counter 16 may generate the count value based upon which bit of the counter/timer 215 has been selected by the granularity m register 211. More particularly, the counter/timer 215 may be continuously incrementing based on the clock source 213 and the count value may increment each time the bit specified by m toggles. The control unit 207 may receive the count value into an internal register (not shown). The control unit 207 may also receive the count N from the multiplier register 205 (block 303). The control unit 207 may monitor the processor state register 201 to determine whether the processor is in an allowable monitored state (block 305). More particularly, in one embodiment, if the strand running on a processor core 12 is in the HALT or PARK states, and in some embodiments, the PAUSE state, the control unit 207 may disable the hang detection operation for that strand until the state transitions to an allowable state. For example, in one embodiment, the control unit 207 may simply internally keep the count value in a reset state. Similarly, if a processor core 12 is in a low power or other mode or state that would cause a hang, each of the control units 207-1 through 207-$n$ may disable the hang detection operation.

If the processor core and the strand are in allowable hang detection states (block 305), and one or more instructions being executed in the strand have a longer than normal completion time (block 307), the multiplier register 205 may be changed to extend the timeout period (block 309). The control unit 207 may monitor the instruction completion indication provided by the instruction completion detection unit 203 (block 311).

If an instruction completes (block 311), the multiplier register count N reset to the default programmed value and the internal count value is reset to zero (block 313) and operation proceeds as described above in conjunction with the description of block 303. However, if no instruction has completed (block 311), control unit 207 compares the received count value to the multiplier count N to determine whether the timeout value has been exceeded (block 315). If the count value has not exceeded the count N, control unit 207 continues to check for instruction completion (block 311) and timeout conditions (block 315). If the timer count value exceeds the count N (block 315), control unit 207 generates a hang indication and provides the hang indication to the error processing unit 31 (block 317).

In various embodiments, the error processing unit 31 may handle the error condition in a manner appropriate for the system. For example, in one embodiment, the error processing unit 31 may send an error message, or generate an interrupt to a system managing processor (not shown) or to one of the other processor cores 12, which may in turn generate an error message to be provided to a user in a variety of different ways. In addition, the error processing unit 31 may also monitor processor states, and hang indications. In one embodiment, the error processing unit 31 may not acknowledge a hang indication received from a processor core that is in a low power or other non-allowable hang detection state.

Figure 3:
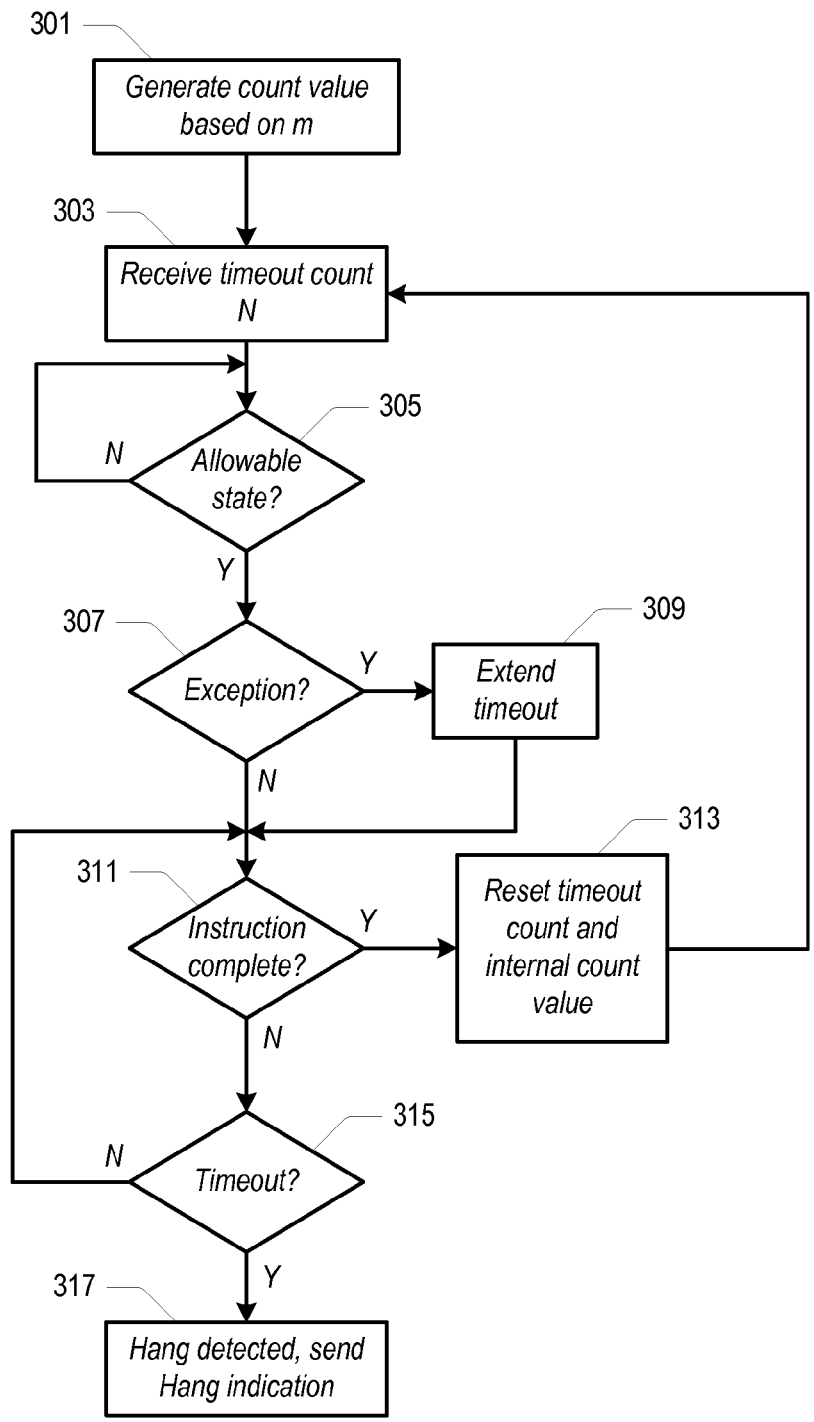
FIG. 3 is a flow diagram describing operational aspects of the hang detection unit of FIG. 1 and FIG. 2.

It is noted that although the various blocks have been shown in FIG. 3 and described in a particular order, it is contemplated that in other embodiments, the steps may be carried out in a different order.

It is also noted that although the above embodiments have been described in the context of a multi-core processor, it is contemplated that in other embodiments the hang detection unit 15 may be implemented in a single core processor.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
a plurality of processor cores, each including:
one or more instruction execution pipelines, each configured to execute instructions; and
a hang detection unit including:
a counter unit configured to provide a count value based on a clock source having a frequency that is independent of a frequency of a processor core clock; and
a detector logic unit coupled to the counter unit and to the instruction pipeline, wherein the detector logic unit is configured to determine whether a given instruction execution pipeline has ceased processing a given instruction based upon a state of the processor core and whether or not the given instruction has completed execution prior to the count value exceeding a predetermined value, wherein the detector logic unit includes a multiplier register configured to store the predetermined value, wherein the multiplier register is configured to be dynamically updated based on an instruction type.

2. The processor of claim 1, wherein the counter unit includes a counter having a plurality of bits, wherein the counter is configured to increment in response to a transition of the clock source.

3. The processor of claim 2, wherein the counter unit is configured to programmably select which bit of the counter corresponds to the count value.

4. The processor of claim 1, wherein the detector logic unit is configured to reset a value corresponding to the count value in response to a completion of execution of the given instruction.

5. The processor of claim 1, wherein the detector logic unit is configured to determine that the given instruction execution pipeline has ceased processing the given instruction in response to the count value exceeding the predetermined value and in response to detecting that the given instruction has not completed execution.

6. The processor of claim 5, wherein the detector logic unit is further configured to disable detection of a hang condition in response to a determination that a strand is in a predefined state in which instruction execution is stopped.

7. The processor of claim 1, wherein the detector logic unit includes an instruction completion detection unit configured to detect whether the given instruction has completed execution.

8. The processor of claim 1, wherein, during the determining, the detector logic unit is configured to increase the predetermined value in response to a determination that the given instruction has an execution time that is longer than a predetermined execution time.

9. The processor of claim 1, wherein the hang detection unit includes a respective detector logic unit for each strand executing on the one or more instruction execution pipelines, and wherein each of the respective detector logic units is configured to operate independently of each other respective detector logic unit.

10. The processor of claim 1, wherein the processor further comprises an error processing unit coupled to each of the plurality of processor cores, wherein each of the hang detection units is configured to provide a hang signal to the error processing unit in response to determining that the given instruction execution pipeline has ceased processing the given instruction.

11. A method comprising:
one or more instruction execution pipelines of a processor core executing instructions; and
a hang detection unit including a counter unit generating a count value based on a clock source having a frequency that is independent of a frequency of a processor core clock; and
a detector logic unit determining, based upon a state of the processor core and whether or not the given instruction has completed execution prior to the count value exceeding a predetermined value, whether a given instruction execution pipeline has ceased processing a given instruction, wherein the predetermined value is stored in a multiplier register that is dynamically updated based on an instruction type.

12. The method of claim 11, wherein the generating includes a counter of the counter unit that includes a plurality of bits, incrementing in response to a transition of the clock source.

13. The method of claim 12, wherein the generating includes programmably selecting which bit of the counter corresponds to the count value.

14. The method of claim 11, wherein the determining whether a given instruction pipeline has ceased processing a given instruction includes the detector logic unit resetting a value corresponding to the count value in response to a completion of execution of the given instruction.

15. The method of claim 11, further comprising the detector logic unit determining that the given instruction execution pipeline has ceased processing the given instruction in response to determining that the count value exceeded the predetermined value and in response to detecting that the given instruction has not completed execution.

16. The method of claim 15, further comprising the detector logic disabling detection of a hang condition in response to a determination that a strand is in a predefined state in which instruction execution is stopped.

17. The method of claim 11, further comprising the detector logic increasing the predetermined value during operation in response to a determination that the given instruction has an execution time that is longer than a predetermined execution time.

18. A processor comprising:
one or more instruction execution pipelines, each configured to execute instructions; and
a hang detection unit including:
a counter unit configured to provide a count value based on a clock source having a frequency that is independent of a frequency of a processor core clock; and
a detector logic unit coupled to the counter unit and to the instruction pipeline, wherein the detector logic unit is configured to determine whether a given instruction pipeline has ceased processing a given instruction based upon a state of the processor core and whether or not the given instruction has completed execution prior to the count value exceeding a predetermined value, wherein the detector logic unit includes a multiplier register configured to store the predetermined value, wherein the multiplier register is configured to be dynamically updated based on an instruction type.

19. A system comprising:
a processor including:
a plurality of processor cores, each processor core including:
one or more instruction execution pipelines, each configured to execute instructions; and
a hang detection unit coupled to the one or more instruction execution pipelines and configured to:
generate a count value based on a clock source having a frequency that is independent of a frequency of a processor core clock; and
determine whether a given instruction execution pipeline has ceased processing a given instruction based upon a state of the processor core and whether or not the given instruction has completed execution prior to the count value exceeding a predetermined value, wherein the detector logic unit includes a multiplier register configured to store the predetermined value, wherein the multiplier register is configured to be dynamically updated based on an instruction type; and
an error processing unit coupled to each of the plurality of processor cores, wherein the error processing unit is configured to receive a hang indication from the hang detection unit in response to a determination that a given instruction execution pipeline has ceased processing a given instruction.

20. The system of claim 19, wherein the hang detection unit is configured to increase the predetermined value during operation in response to a determination that the given instruction has an execution time that is longer than a predetermined execution time.

* * * * *

UNITED STATES PATENT AND TRADEMARK OFFICE
CERTIFICATE OF CORRECTION

PATENT NO. : 9,052,911 B2
APPLICATION NO. : 13/585348
DATED : June 9, 2015
INVENTOR(S) : Ali Vahidsafa and Chih Heng Liu Page 1 of 1

It is certified that error appears in the above-identified patent and that said Letters Patent is hereby corrected as shown below:

On the title page item (54) and in the specification, col. 1, line 1,

Please change "MECHANISM FOR CONSISTENT CORE HANG DETECTION IN A A PROCESSOR CORE" to "MECHANISM FOR CONSISTENT CORE HANG DETECTION IN A PROCESSOR CORE".

Signed and Sealed this
Thirteenth Day of October, 2015

Michelle K. Lee
*Director of the United States Patent and Trademark Office*